(12) United States Patent
Malzbender et al.

(10) Patent No.: US 6,888,544 B2
(45) Date of Patent: May 3, 2005

(54) APPARATUS FOR AND METHOD OF RENDERING 3D OBJECTS WITH PARAMETRIC TEXTURE MAPS

(75) Inventors: Thomas Malzbender, Palo Alto, CA (US); Daniel G. Gelb, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 251 days.

(21) Appl. No.: 10/000,119

(22) Filed: Oct. 31, 2001

(65) Prior Publication Data

US 2002/0060679 A1 May 23, 2002

Related U.S. Application Data

(63) Continuation-in-part of application No. 09/528,700, filed on Mar. 17, 2000, now Pat. No. 6,515,674.

(51) Int. Cl.$^7$ ............................................... G06T 15/00
(52) U.S. Cl. ........................................ 345/423; 345/582
(58) Field of Search ....................... 345/419, 423–425, 345/428, 582–587

(56) References Cited

U.S. PATENT DOCUMENTS

| | | | | |
|---|---|---|---|---|
| 5,544,291 A | * | 8/1996 | Gilley et al. | 345/423 |
| 5,740,343 A | * | 4/1998 | Tarolli et al. | 345/587 |
| 5,870,102 A | * | 2/1999 | Tarolli et al. | 345/586 |
| 6,037,949 A | * | 3/2000 | DeRose et al. | 345/582 |
| 6,124,858 A | * | 9/2000 | Ge et al. | 345/619 |
| 6,489,960 B2 | * | 12/2002 | DeRose et al. | 345/423 |
| 6,515,674 B1 | * | 2/2003 | Gelb et al. | 345/582 |
| 6,700,585 B2 | * | 3/2004 | Ritter | 345/582 |

FOREIGN PATENT DOCUMENTS

WO  WO01/71668  9/2001

OTHER PUBLICATIONS

Neyret et al., Pattern–Based Texturing Revisited, ACM, SiGGRAPH 99, Aug. 1999,pp. 235–242.*
Miler et al., "On–the–Fly Texture Computation for Real–Time Surface Shading", Apr. 1998, IEEE Computer Graphics and Applications, pp. 44–58.*

* cited by examiner

Primary Examiner—Phu K. Nguyen (57) ABSTRACT

A graphics system that employs parametric texture maps. The graphics system renders surface features of a 3D object in a manner that is direction dependent but without the time consuming and expensive calculations involved in the evaluation of lighting equations on a per pixel basis. A parametric texture map holds a set of parameters that define a surface structure in a manner in which the appearance of the surface structure varies in response to a direction vector. The direction vector may be any user-defined vector including a light source vector or a half-angle vector. The parameters are those of a predetermined equation, the evaluation of which does not involve vector calculations. The equation may take any form including a polynomial equation or a non-polynomial equation. The graphic system renders a polygon with the surface structure using the equation.

49 Claims, 7 Drawing Sheets

APPARATUS FOR AND METHOD OF RENDERING 3D OBJECTS WITH PARAMETRIC TEXTURE MAPS

RELATED U.S. APPLICATION

This application is a continuation-in-part to the commonly owned, patent application Ser. No. 09/528,700, entitled "Apparatus for and Method of Rendering 3D Objects with Parametric Texture Maps", with filing date Mar. 17, 2000 now U.S. Pat. No. 6,515,674 and assigned to the assignee of the present invention.

TECHNICAL FIELD

The present invention relates generally to the field of computer graphics and pertains more particularly to an apparatus for and method of rendering three-dimensional (3D) objects with parametric texture maps in a computer graphics system.

BACKGROUND ART

Modern computer systems have become increasingly graphics intensive. Dedicated special purpose memories and hardware have been developed to meet this need. A conventional computer graphics system includes a display device having a two-dimensional (2D) array of light emitting areas. The light emitting areas are usually referred to as pixels which is an abbreviation for picture elements. Such a graphics system typically employs hardware, software, or both to generate a 2D array of values that determine the colors or shades of grey that are to be emitted from the corresponding pixels of the display.

Computer graphics systems are commonly employed for the display of 3D objects. Typically, such a system generates what appears to be a 3D object on a 2D display by generating 2D views of the 3D object that is modeled in the computer memory. The 2D view of a 3D object which is generated at a particular time usually depends at least on a spatial relationship between the 3D object and a viewer of the 3D object at the particular time. This spatial relationship may be referred to as the view or eye point direction. For example, a car is a 3D object having a front and a back. However, whether one can see the taillights will depend on where one is viewing the car from. A view direction that is directly in front of the car will not show the taillights while a view direction that is directly behind the car will.

The process by which a computer graphics system generates the values for a 2D view of a 3D object is commonly referred to as image rendering or scan conversion. The graphics system usually renders a 3D object by subdividing the 3D object into a set of polygons and rendering each of the polygons individually.

The values for a polygon that are rendered for a particular view direction usually depend on the surface features of the polygon and the effects of lighting on the polygon. The surface features include details such as surface colors and surface structures. The effects of lighting usually depend on a spatial relationship between the polygon and one or more light sources. This spatial relationship may be referred to as the light source direction. For example, if there is only one light source, the side of the object closest to the light source will be illuminated while the side of the object furthest from the light source might be in shadow.

Typically, the evaluation of the effects of lighting on an individual pixel in a polygon for a particular view direction involves a number of 3D vector calculations. One of ordinary skill in the art will recognize that the standard Blinn/Phong lighting equation is as follows:

$$I = k_a I_a + k_d I_d (N \cdot L) + k_s I_s (N \cdot H)^n \quad (1)$$

where $k_a$, $k_d$, and $k_s$ are constants. Equation (1) states that the light intensity I for a particular pixel is a function of the sum of the ambient contribution $I_a$, the diffuse contribution $I_d$, and the specular contribution $I_s$, at that location. Lighting calculations based on Equation 1 include floating-point, square-root and divide operations when used with normalized vectors. Such calculations are usually time consuming and expensive whether performed in hardware or software.

One conventional method for reducing such computation overhead is to evaluate the effects of lighting at just a few areas of a polygon, such as the vertices, and then to interpolate the results across the entire polygon. Examples include methods which are commonly referred to as flat shading and Gouraud shading. Such methods usually reduce the number of calculations that are performed during scan conversion and thereby increase rendering speed. Unfortunately, such methods also usually fail to render shading features that are smaller than the areas of individual polygons. If the polygons are relatively large, the view will be noticeably distorted.

One conventional method for rendering features that are smaller than the area of a polygon is to employ what is commonly referred to as a texture map. A typical texture map is a table that contains a pattern of color values for a particular surface feature. For example, a wood grain surface feature may be rendered using the surface and a texture map that holds a color pattern for wood grain. Unfortunately, texture mapping usually yields relatively flat surface features that do not change with the view direction or light source direction. The appearance of real 3D objects, on the other hand, commonly do change with the view direction, light source direction, or both. These directional changes are commonly caused by 3D structures on the surface of the object, that is, the object is not perfectly flat. Such structures can cause localized shading or occlusions or changes in specular reflections from a light source. The effects can vary with view direction for a given light source direction and can vary with light source direction for a given view direction. These directional changes should be accounted for to provide greater realism in the rendered 2D views.

One conventional method for handling the directional dependence of such structural effects in a polygon surface is to employ what is commonly referred to as a bump map. A typical bump map contains a height field from which a pattern of 3D normal vectors for a surface are extracted. The normal vectors are used to evaluate lighting equations at each pixel in the surface. Unfortunately, such evaluations typically involve a number of expensive and time consuming 3D vector calculations including division and square roots. This can result in decreased rendering speed or increased graphics system cost.

A definite need exists for a system having an ability to meet the efficiency requirements of graphics intensive computer systems. In particular, a need exists for a system which is capable of rendering 2D views of a 3D object in a skillful manner. Ideally, such a system would have a lower cost and a higher productivity than conventional systems. With a system of this type, system performance can be enhanced. A primary purpose of the present invention is to solve this need and provide further, related advantages.

DISCLOSURE OF THE INVENTION

A graphics system is disclosed that employs parametric texture maps. The graphics system renders surface features of a 3D object in a manner that is direction dependent but without the time consuming and expensive calculations involved in the evaluation of lighting equations on a per pixel basis. A parametric texture map holds a set of parameters that define a surface structure in a manner in which the appearance of the surface structure varies in response to a direction vector. The direction vector may be any user-defined vector including a light source vector or a half-angle vector. The parameters are those of a predetermined equation, the evaluation of which does not involve vector calculations. The equation may take any form including a polynomial equation or a non-polynomial equation. The graphic system renders a polygon with the surface structure using the equation.

A method of generating a parametric texture map of a subject in order to render an image under varying conditions is disclosed, in accordance with embodiments of the present invention. The parametric texture map contains at least one varying parameter in a set of varying parameters for an equation that defines variation in pixel color. Each varying parameter in the equation corresponds to a varying condition or effect.

BRIEF DESCRIPTION OF THE DRAWINGS

The above and other objects and advantages of the present invention will be more readily appreciated from the following detailed description when read in conjunction with the accompanying drawing, wherein.

BEST MODES FOR CARRYING OUT THE INVENTION

Figure 1:
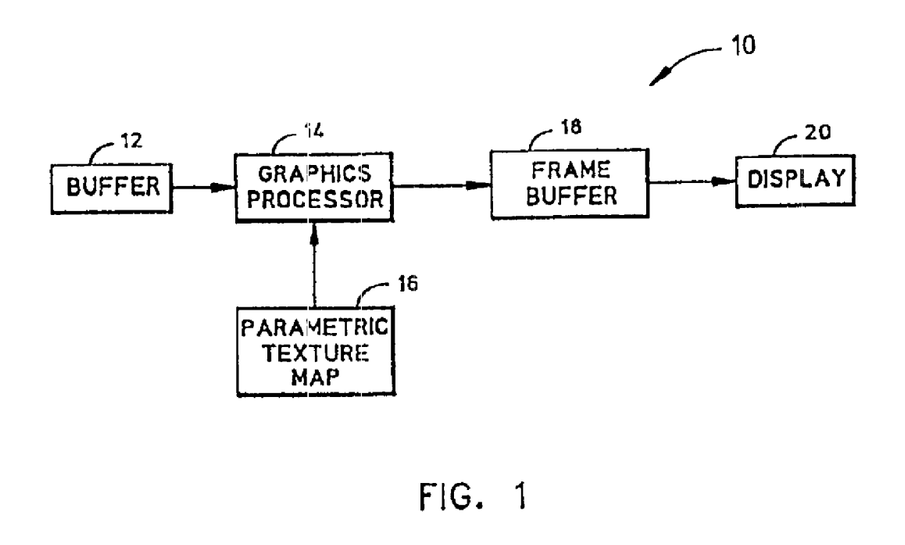
FIG. 1 is a block diagram of a computer graphics system according to a preferred embodiment of the present invention.

Turning first to FIG. 1, a block diagram of a computer graphics system 10 according to a preferred embodiment of the present invention is shown. The computer graphics system 10 includes a buffer 12, a graphics processor 14, a parametric texture map 16, a frame buffer 18, and a display 20. The buffer 12 holds geometry data that describes a 3D object which is to be generated on the display 20. The 3D object is represented in the buffer 12 as a set of polygons in a 3D space. In one embodiment, the polygons are triangles and the geometry data in the buffer 12 includes the 3D coordinates of the vertices of the triangles.

The graphics processor 14 reads the parameters that define the polygons from the buffer 12 and scan converts each polygon. The scan conversion of a polygon yields a 2D view of the polygon which depends on a view direction and a light source direction. A 2D view of a polygon includes a color value for each pixel of the polygon which is visible in the plane of the display 20. The graphics processor 14 writes the color values for the rendered polygons into the frame buffer 18. The color values from the frame buffer 18 are provided to the display 20 on a frame by frame basis. The display 20 can be any conventional 2D display device such as a raster scan device or flat-panel display device.

The parametric texture map 16 holds parameters that define a surface structure in a manner in which the appearance of the surface structure varies with any user-defined vector such as the view vector, the light source vector, or the half-angle vector. The half-angle vector is a vector that is halfway between the view and light vectors. The graphics processor 14 maps the surface structure defined in the parametric texture map 16 onto the polygons obtained from the buffer 12 during scan conversion. The result is a more realistic rendering of 3D features in a surface on a 3D object in comparison to texture mapping but without the computational penalties associated with bump mapping.

In one embodiment, the parameters contained in the parametric texture map 16 are the A1, A2, A3, A4, A5, and A6 coefficients for evaluating the following second order polynomial equation:

$$Ci = A1 D_u^2 + A2 D_v^2 + A3 D_u D_v + A4 D_u + A5 D_v + A6 \quad (2)$$

where $D_u$ and $D_v$ are the 2D components of the user-defined vector. For example, if the parametric texture map 16 is adapted to the view direction then $D_u$ and $D_v$ are the 2D components of an eye point vector. Likewise, the terms $D_u$ and $D_v$ are the 2D components of a half-angle vector if the parametric texture map 16 is adapted to the half-angle vector.

TABLE 1 illustrates the general contents of the parametric texture map 16. The parametric texture map 16 contains n by m entries. Each of the n by m entries corresponds to a sample of a particular surface modeled by the parametric texture map 16. These samples may be referred to as texels which is an abbreviation for texture elements. The coefficients for an individual texel are denoted as $A1_{ij}$ to $A6_{ij}$ wherein i ranges from one to n and j ranges from one to m.

TABLE 1

| | | | |
|---|---|---|---|
| $A1_{1,1}\ A2_{1,1}$ | $A1_{1,2}\ A2_{1,2}$ | ... | $A1_{1,m}\ A2_{1,m}$ |
| $A3_{1,1}\ A4_{1,1}$ | $A3_{1,2}\ A4_{1,2}$ | | $A3_{1,m}\ A4_{1,m}$ |
| $A5_{1,1}\ A6_{1,1}$ | $A5_{1,2}\ A6_{1,2}$ | | $A5_{1,m}\ A6_{1,m}$ |
| $A1_{2,1}\ A2_{2,1}$ | $A1_{2,2}\ A2_{2,2}$ | ... | $A1_{2,m}\ A2_{2,m}$ |
| $A3_{2,1}\ A4_{2,1}$ | $A3_{2,2}\ A4_{2,2}$ | | $A3_{2,m}\ A4_{2,m}$ |
| $A5_{2,1}\ A6_{2,1}$ | $A5_{2,2}\ A6_{2,2}$ | | $A5_{2,m}\ A6_{2,m}$ |
| . | . | | . |
| . | . | | . |
| . | . | | . |
| $A1_{n,1}\ A2_{n,1}$ | $A1_{n,2}\ A2_{n,2}$ | ... | $A1_{n,m}\ A2_{n,m}$ |
| $A3_{n,1}\ A4_{n,1}$ | $A3_{n,2}\ A4_{n,2}$ | | $A3_{n,m}\ A4_{n,m}$ |
| $A5_{n,1}\ A6_{n,1}$ | $A5_{n,2}\ A6_{n,2}$ | | $A5_{n,m}\ A6_{n,m}$ |

The parametric texture map 16 is representative of a set of parametric texture maps that may be used for rendering 3D objects in the graphics system 10. Each parametric texture map according to the present technique is adapted to a particular surface structure that is to be mapped onto a 3D object. In addition, each parametric texture map is adapted to provide realistic 3D rendering in response to the user-defined vector. For example, the parametric texture map 16 may be adapted to provide realistic 3D rendering in response to a varying light source direction for a given fixed view direction. Alternatively, the parametric texture map 16 may be adapted to provide realistic 3D rendering in response to a varying view direction for a given fixed light source direction.

In one embodiment, a parametric texture map may be adapted to a particular color channel of the display 20. For example, the graphic system 10 may include a separate parametric texture map for each of the red, green, and blue channels for an RGB display for a particular surface structure. One drawback to this approach is that three parametric texture maps are required. Alternatively, a single parametric texture map may be multiplied with each channel in a complete RGB texture map. In this embodiment, the parametric texture map encodes the brightness changes as a result of changes in the light vector, for example, and modulates the RGB color values in a corresponding texture map to yield the resultant color values. It is also possible to render objects illuminated by multiple light sources using this type of parametric texture map. Since the RGB color values are separate from the intensity, the intensity values can be calculated for different light sources and combined to get a final intensity value. The per-pixel intensity values are then multiplied with the RGB values to get the output color. A wide range of useful operations can be achieved by using different blending modes to combine parametric texture map evaluation results with calculated lighting, texture maps, or other sources during texture blending in the graphics pipeline.

Figure 2:
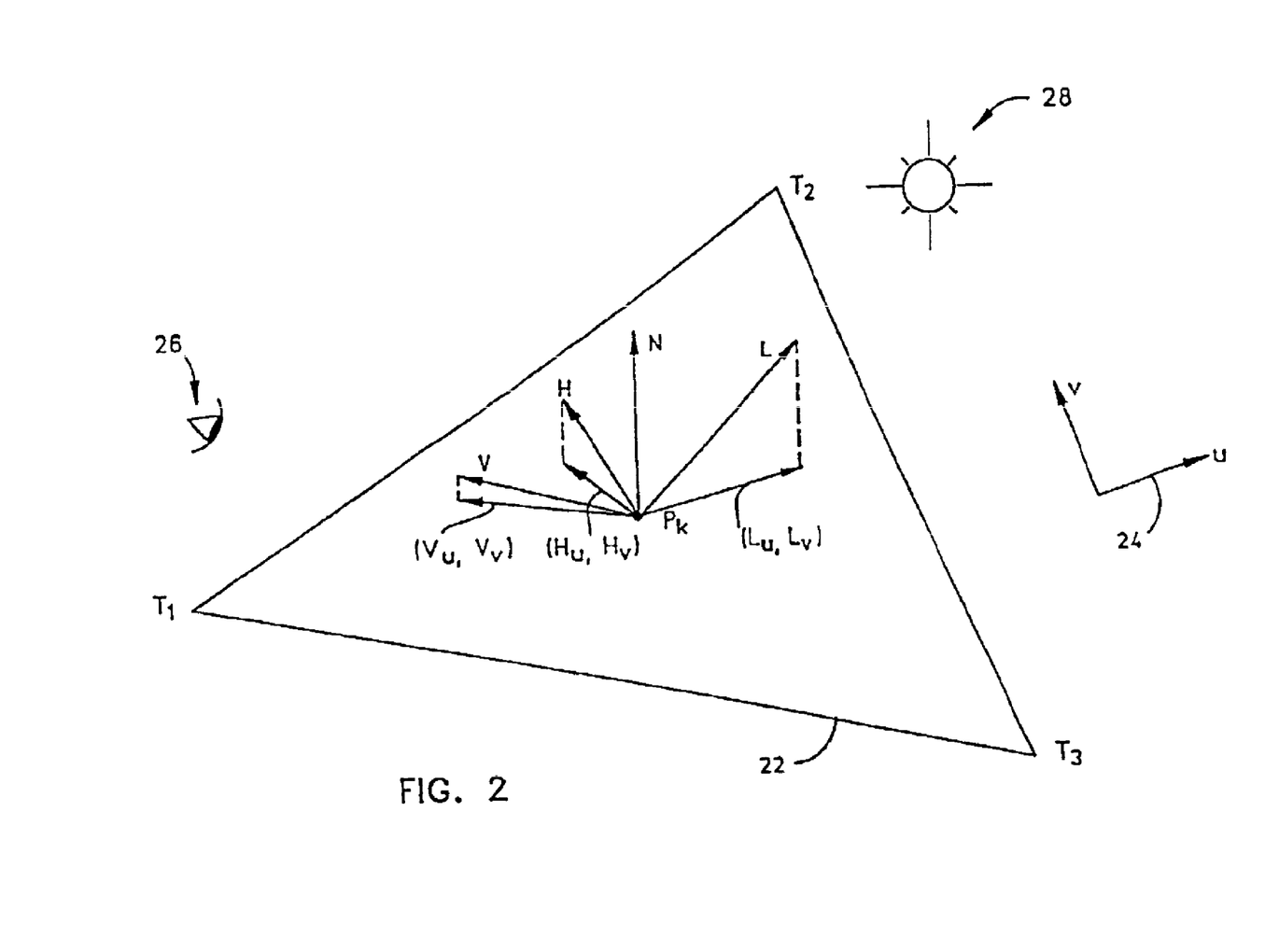
FIG. 2 is a graphical representation of a polygon which is defined in the buffer of FIG. 1 and which is to be rendered by the graphics processor of FIG. 1 using surface features defined by the parametric texture map of FIG. 1.

Turning now to FIG. 2, a graphical representation of a polygon 22 which is defined in the buffer 12 of FIG. 1 and which is to be rendered by the graphics processor 14 of FIG. 1 using surface features defined by the parametric texture map 16 of FIG. 1 is shown. The polygon 22 is defined by a set of three vertices ($T_1$, $T_2$, and $T_3$) in a 3D space. The local coordinate space is represented by a set of u and v axes 24 which are usually defined by the spatial texture coordinates of the polygon 22.

A surface normal vector N for the polygon 22 is shown, along with an eye point vector V, a light source vector L, and a half-angle vector H. Note that normal vectors are usually defined for the vertices rather than the entire polygon to improve realism. Here a single normal for the polygon is illustrated for simplicity. The eye point vector V represents a view direction from a pixel $P_k$ of the polygon 22 to an eye point 26. The light source vector L represents a light source direction from the pixel $P_k$ to a light source 28. The half-angle vector H represents the vector that is halfway between the eye point vector V and the light source vector L. Also shown is a ($V_u$, $V_v$) vector which is the eye point vector V projected down into the plane of the polygon 22. Likewise, a ($L_u$, $L_v$) vector is the projection of the light source vector L and a ($H_u$, $H_v$) vector is the projection of the half-angle vector H.

Figure 3:
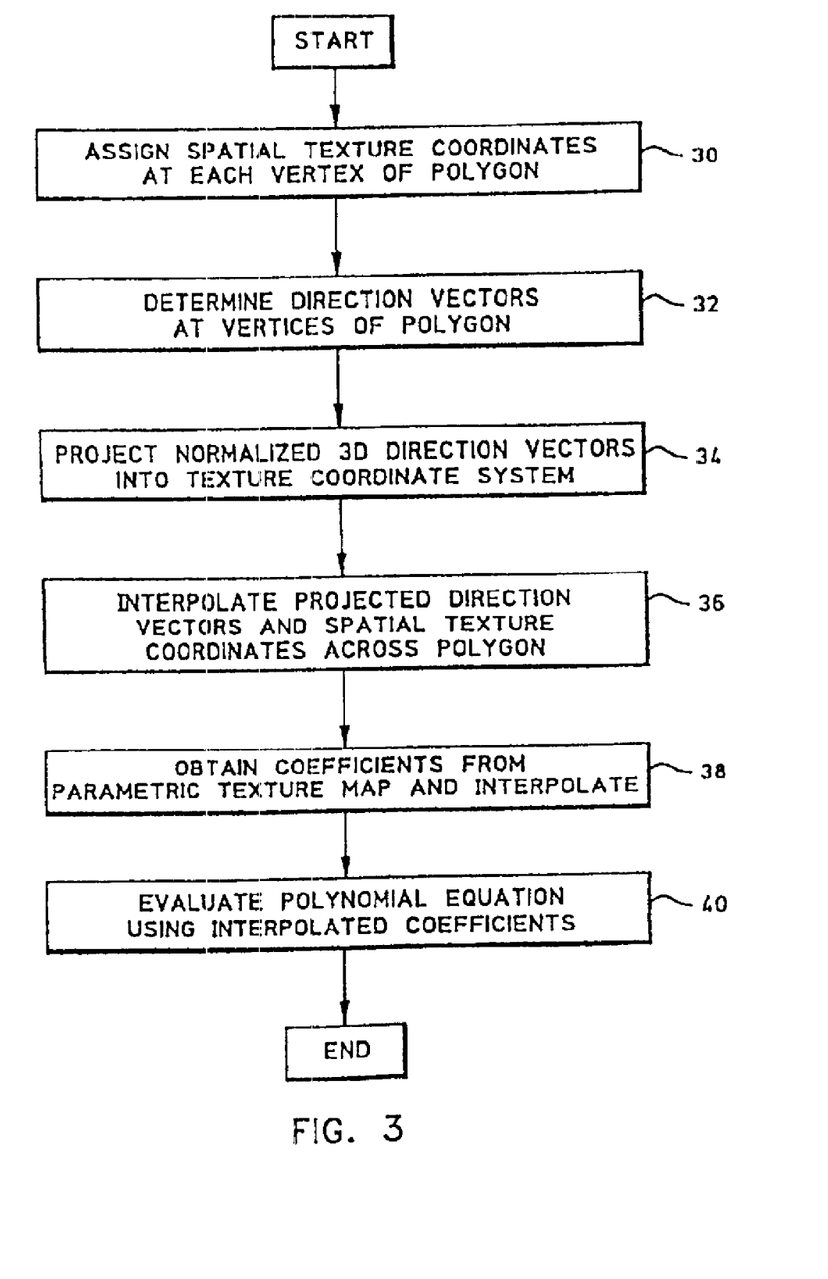
FIG. 3 is a flow diagram of a method according to the present invention for rendering a polygon using surface features defined by a parametric texture map.

FIG. 3 shows a flow diagram of a method according to the present invention for rendering a polygon using surface features defined by a parametric texture map. The steps shown are used to generate a color value for each of a set of pixels in the polygon 22 of FIG. 2. The following description for purposes of illustration focuses on the pixel $P_k$ of FIG. 2 as an example. The coefficients $A1_{ij}$ to $A6_{ij}$ in the parametric texture map 16 of FIG. 1 are adapted to yield color values in response to a user-defined vector such as a light source vector or an half-angle vector. This adaptation is done by using linear regression from a set of images that provide color values at each pixel for varying vector directions. The following description for purposes of illustration focuses on an example in which the coefficients $A1_{ij}$ to $A6_{ij}$ are adapted to yield color values in response to a light source vector for a fixed eye point vector. Nevertheless, these techniques are readily applicable to a parametric texture map which contains coefficients that are adapted to yield color values in response to any user-defined vector. In addition, the coefficients $A1_{ij}$ to $A6_{ij}$ in the parametric texture map 16 yield color values for a particular color channel of the display 20 of FIG. 1. Additional parametric texture maps may be used to yield color values for the remaining channels. The steps are repeated with each polygon in the set of polygons representing the 3D object that is stored in the buffer 12 of FIG. 1. The process begins at START.

At step 30, the graphics processor 14 of FIG. 1 assigns spatial texture coordinates u and v of the parametric texture map 16 at each vertex $T_1$, $T_2$, and $T_3$ of the polygon 22. The spatial texture coordinates for the vertices $T_1$, $T_2$, and $T_3$ are denoted as $u_{T1}$, $v_{T1}$, $u_{T2}$, $v_{T2}$, and $u_{T3}$, $v_{T3}$, respectively.

At step 32, the graphics processor 14 determines direction vectors at the vertices of the polygon 22. The direction vectors in this example are light source vectors at the vertices of the polygon 22. The light source vector at the vertex $T_1$ is a normalized 3D vector that points from $T_1$ to the 3D coordinates of the light source 28 of FIG. 2. Similarly, the light source vector at the vertices $T_2$ and $T_3$ are normalized 3D vectors that point from $T_2$ and $T_3$, respectively, to the 3D coordinates of the light source 28.

At step 34, the graphics processor 14 projects the normalized 3D direction vectors determined at step 32 into the texture coordinate system u and v of the parametric texture map 16. This yields 2D parameterization or 2D components of each normalized 3D direction vector in the texture coordinate system of the parametric texture map 16. A 2D parameterization of a normalized 3D direction vector is denoted as $D_u$, $D_v$.

At step 36, the graphics processor 14 interpolates the projected direction vectors $D_u$, $D_v$ determined at step 34 and spatial texture coordinates $u_{T1}$, $v_{T1}$, $u_{T2}$, $v_{T2}$, and $u_{T3}$, $v_{T3}$ determined at step 30 across the polygon 22. This associates each pixel of the polygon 22 with $D_u$, $D_v$ parameters and with u and v texel coordinates in the coordinate space of the parametric texture map 16. The interpolation of step 36 may be performed using a variety of known techniques.

At step 38, the graphics processor 14 obtains the polynomial coefficients $A1_{ij}$ to $A6_{ij}$ from the parametric texture map 16 and interpolates them. It is important to note that there are several options for evaluating and interpolating the texture map. Interpolated texture coordinates will not yield exact texels in the input texture map so texture interpolation is needed. These interpolation methods are well known and include nearest-neighbor, bilinear, trilinear, and anisotropic interpolation. One option is to evaluate the polynomial at each of the sample points and then to interpolate the output value. Another option is to interpolate the polynomial coefficients to generate an interpolated polynomial and then to evaluate the polynomial. FIG. 3 illustrates the second option.

At step 40, the graphics processor 14 evaluates Equation (2) using the interpolated $D_u$ and $D_v$ terms from step 36 and the interpolated coefficients $A1_{ij}$ to $A6_{ij}$ from step 38 on a per pixel basis. For pixel $P_k$, Equation (2) yields a texel value $C_i$ which may then be used as a color value, luminance value, or other pixel or texture data.

It is generally the case that parametric texture mapping effects should only be applied to polygons that are front facing relative to the user-defined vector being used. In order to identify front facing and back facing polygons, a third variable is used. This third parameter D is typically the result of projecting the user-defined vector onto the vertex normal vectors. For front facing polygons, D will be positive and for back facing polygons, D will be negative. Fundamentally, D is the dot product between the vertex normal vector and the user defined vector. It may or may not be desirable to have the parametric texture mapping effects stop abruptly at the transition from front facing to back facing. If desirable, the user can attenuate the effects to give a sharp or gradual cutoff as needed, possibly including evaluation for triangles that are back facing with respect to the user-defined vector.

The present techniques model the 3D effects of surface features by modeling the contribution of those features to surface colors directly. The contributions are then represented by the coefficients of Equation (2). The present techniques yield a mapping of surface features to a polygon that is direction dependent and that provides a quality of realism which is comparable to that yielded by the evaluation of lighting equations on a per pixel basis. Yet the evaluation of Equation (2), a second order polynomial, is relatively easy to perform in hardware, software, or both in comparison to the evaluation of lighting equations on a per pixel basis. The evaluation of Equation (2) involves integer multiply and add operations whereas the evaluation of lighting equations involves floating-point, square-root and divide operations. Although Equation (2) has been chosen to be a bi-quadratic polynomial, bi-cubic and higher order polynomials could also be used. Even non-polynomial functions could be supported by the present techniques. However, more complex functions are not currently preferred due to their higher implementation costs which are currently considered excessive.

Figure 4A:
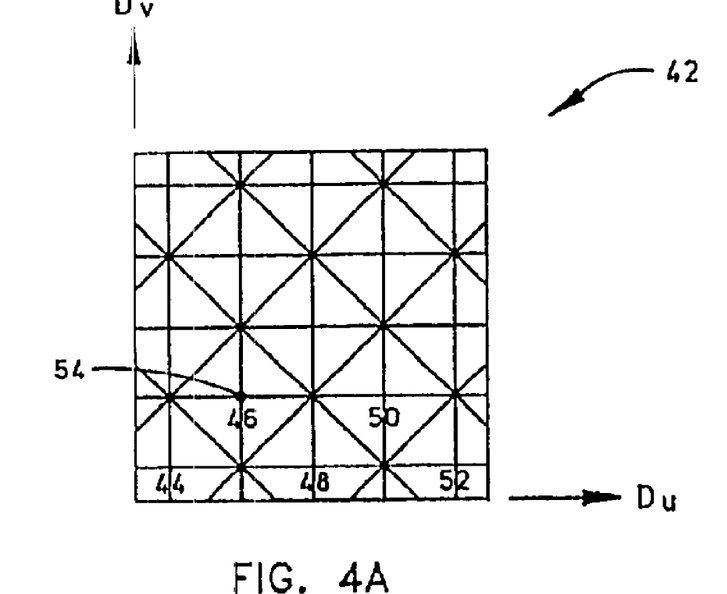
FIGS. 4A–4C illustrate an arrangement for determining the coefficients in a parametric texture map for an example surface structure employed in the present invention.
Figure 4B:
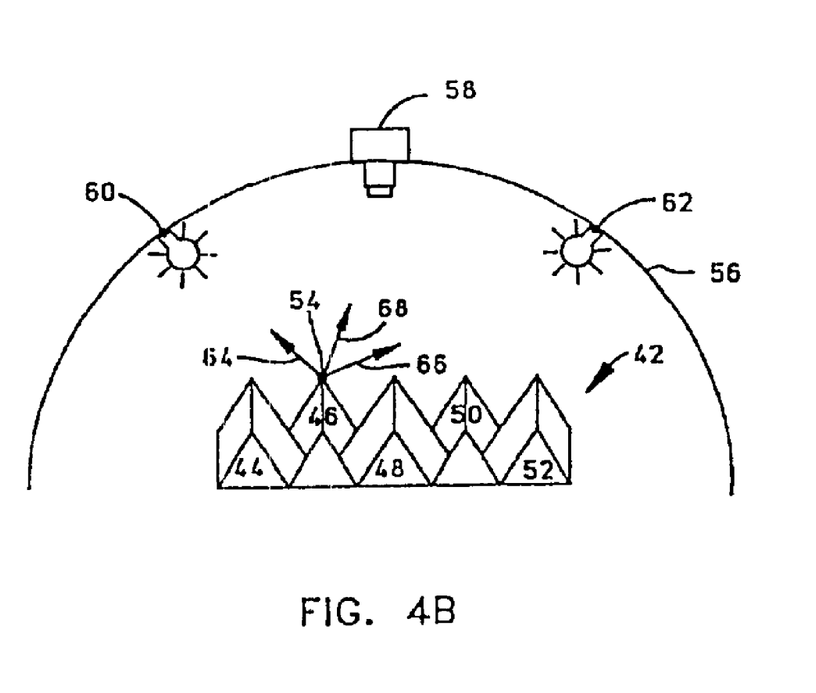
Figure 4C:
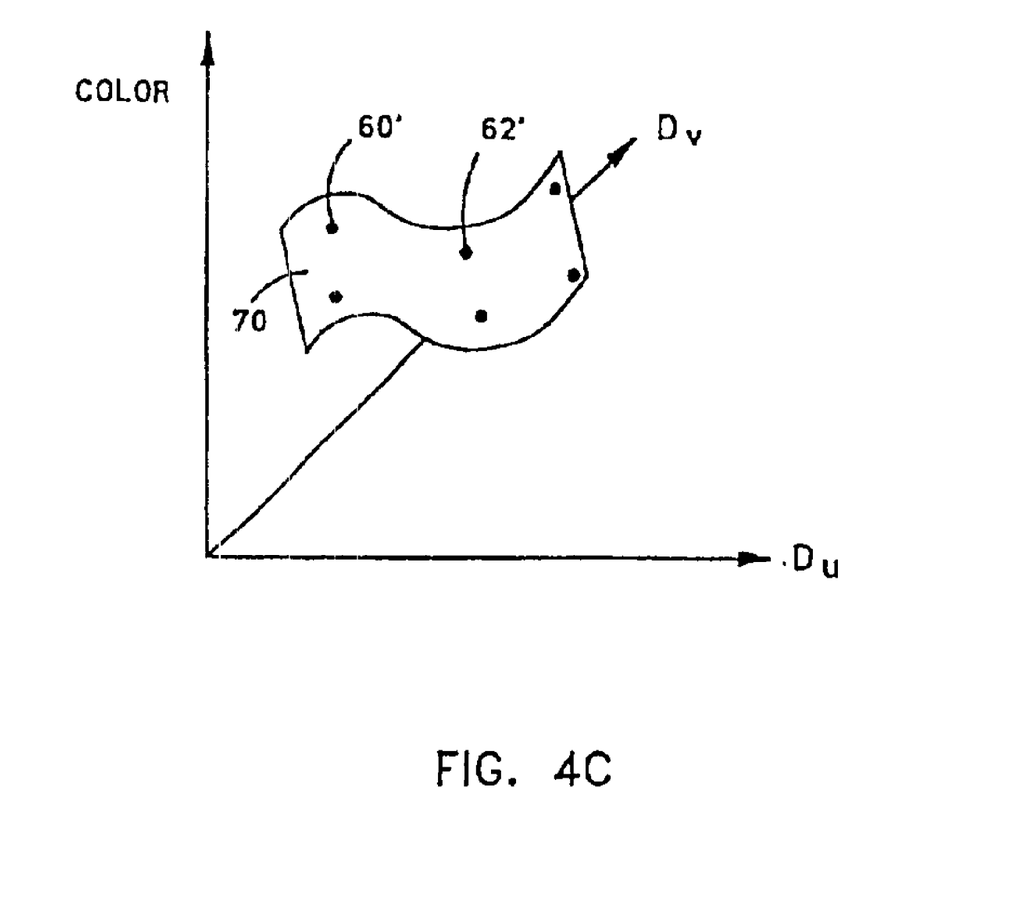

Turning now to FIGS. 4A–4C, an arrangement for determining the coefficients $A1_{ij}$ to $A6_{ij}$ of the parametric texture map 16 of FIG. 1 for an example surface structure 42 is illustrated. FIG. 4A shows a top view of the surface structure 42. The surface structure 42 is shown aligned to a pair of axes $D_u$ and $D_v$. The surface structure comprises an array of square right pyramid structures 44–52. A sub area 54 represents one of the texels of the surface structure. The surface structure is just one example of a surface structure and any imaginable surface structure may be modeled using the present techniques.

FIG. 4B shows a side view of the surface structure 42 of FIG. 4A along with a hemispherical dome 56 which is used to position a camera 58 and a light source. In this case, a single light source is shown positioned at two example positions 60 and 62 on the dome. A vector 64 represents a light source vector for the position 60 and a vector 66 represents a light source vector for the position 62.

The camera 58 is fixed in its position on the dome 56 when obtaining coefficients for a parametric texture map 16 that is adapted to yield color values in response to the light source vector. A vector 68 represents the eye point vector for the fixed position of the camera. The camera is used to obtain an image of the surface structure 42 for each of a set of predetermined positions of the light source on the dome 56. Each predetermined position of the light source represents a different light source vector and the corresponding image obtained with the camera yields a color value for each texel of the surface structure 42. For example, images obtained from n different positions of the light source yields n color values for each texel with each color value corresponding to a different light source vector for the eye point vector 68.

FIG. 4C shows a graph of the color values for the texel 54 obtained with the camera 58 for six different positions of the light source on the dome 56. These color values include a color value 60' which was obtained with the light source at position 60 and a color value 62' which was obtained with the light source at position 62. The color values are plotted against the axes $D_u$ and $D_v$. The coefficients $A1_{ij}$ to $A6_{ij}$ for the texel 54 for the eye point vector 68 are obtained by fitting the polynomial of Equation (2) to the color values obtained for the texel 54 using known techniques. A surface 70 is shown that represents a fit between the polynomial of Equation (2) and the six color values obtained by the camera 58 for the texel 54. The fit of the surface 70 to the n color values obtained by the camera 58 may be accomplished using standard least mean square methods to yield the polynomial coefficients.

This technique may readily be modified to obtain coefficients for a parametric texture map 16 that is adapted to yield color values in response to any user-defined vector. For example, the light source may be fixed at position 60 which corresponds to the light source vector 64. Then the camera 58, representing the eye point vector, is moved to n different positions on the dome 56. A surface fit to the obtained color values is performed in a manner similar to that described above.

A further modification of this technique is to combine parametric texture maps with existing per-vertex or per-pixel lighting hardware to generate a variety of useful effects. One method is to modulate the output of standard Blinn/Phong lighting computations by the result of evaluating a light vector dependent parametric texture map. By doing this, Equation 1 becomes:

$$I=k_aI_a+k_dI_d(N \cdot L)+k_sI_s(N \cdot H)^n PTM(u,v,L_u,L_v) \qquad (3)$$

where PTM is the parametric texture map function as in Equation (2) and $L_u$ and $L_v$ represent the projection of the light source vector L as above. In the trivial case where the parametric texture map varies spatially but is constant for all incident light directions, Equation (3) becomes functionally equivalent to specular maps or gloss maps which are well known in the art. The dependence on light direction that is not available with conventional specular maps could be used to reproduce effects such as shadowing where texels do not exhibit specular highlights due to shadowing by small scale surface variations.

Another modification is to utilize parametric texture maps to simulate off-specular and Fresnel effects. Many surfaces exhibit increased specularity for low angles of incidence due to decreases in the apparent roughness. This can be reproduced using the above technique by modulating the specular contribution with a parametric texture map whose magnitude increases as the incident angle approaches grazing. Incident illumination dependence can also be used to approximate Fresnel effects which are well known. Fresnel effects are important for many surfaces, such as metal and glass, where reflectance increases greatly for grazing incident illumination angles. The reflectance of glass and other dielectrics are low when the incident direction is nearly equivalent to the surface normal. Metals also exhibit Fresnel reflectance including wavelength dependence. As a result, the color of reflected light changes as the incident angle changes due to reflectance variations for different wavelengths. These dependencies can be approximated by the polynomial function stored at each texel. The combination of these illumination dependent effects can all be stored in a single parametric texture map. In addition, since texel polynomials in the parametric texture map are independent, these properties can vary across the surface. As a result, a parametric texture map can represent different materials in a single texture map.

Further still, anisotropic materials, which are well known, can be modeled using parametric texture maps. An anisotropic material is one in which the reflectance function has rotational variation about the surface normal. Examples include fur and hair, brushed materials, and burnished metals. Conventional techniques to render anisotropic materials define normal planes for surface points aligned with the direction of anisotropy. The projection of the incident light direction into the normal plane is then used in the lighting calculations. According to the present technique, the function for each texel in the texture map is based on the magnitude of the incident light direction projected into the normal plane. The result of evaluating the parametric texture map is then modulated with calculated specular lighting so that specular highlights occur only in regions where the incident light direction aligns with the direction of anisotropy. Unlike some conventional methods, this technique allows anisotropic materials to be rendered under perspective views with local light sources.

In contrast to well known conventional results, a wide range of new effects can also be achieved. This is made possible by using the parametric texture map to represent any desired data since the projected vector can be assigned by the user directly if desired. Users can choose to leave one of the parameters constant for representing one-dimensional (1D) functions. For example, some time variant functions can be represented in this way such as a photographic sequence of a scene as time varies during the day. One limitation to this effect is that it has difficulty handling scenes that contain abrupt changes from frame to frame.

In addition, instead of using the two axes of standard 2D texture mapping to encode spatial color variations, the two texture coordinates of the texture map can be used as parameters for a bivariate function to represent the reflectance properties of the object. The present technique has the additional advantage over conventional techniques that instead of storing simple color values in the texture map, the present technique can store a function of two variables. This function can be controlled by the light, eye point, half-angle, or other vectors as desired. Therefore, the present technique can be used to represent and render objects with full four dimensional reflectance functions instead of only two as with conventional techniques. Also, unlike conventional techniques, the present technique can reproduce effects of local light or viewpoints.

Further still, the present technique can be utilized in volume rendering. Instead of simply storing 2D parametric texture maps, volume rendering makes use of 3D parametric texture maps. This can be visualized as stacks of 2D texture maps. Similar to above, for volume rendering, function coefficients are stored for every texel. One can then render the volume using 3D texture mapping hardware by evaluating the parametric texture map at every texel to determine voxel, unit volume element, color values. Additionally, an extra function can be used to represent the transparency of each voxel. The parameters for the transparency function are specified by the user to allow voxels with the desired properties to be more or less opaque than other voxels.

One of the difficulties with using traditional bump maps to display surface detail is filtering them to match a particular sampling rate. The naive approach of using MIP maps results in smoothing the surface and thereby removing the bumps themselves. This defeats the purpose of the bump map. Upon review, one will realize that the function that one would like to integrate over is the light radiated from the bumpy patch rather than the surface perturbations themselves. Since parametric texture maps are image-based representations, one can achieve the filtering effect by MIP mapping the coefficients A1–A6 themselves. Support for such a conclusion can be realized by considering the following equation where one is integrating over a patch $\Omega$ with n samples:

$$\frac{1}{n}\sum_{i,j \in \Omega} L_{r,g,b}(a_{0-5}(u_i, v_j)) = L_{r,g,b}\left(\frac{1}{n}\sum_{i,j \in \Omega} a_{0-5}(u_i, v_j)\right) \quad (4)$$

Inspection reveals that the light dependence is linear in the coefficients. According to Equation (4), accumulating coefficients over a patch and then evaluating the sum is equivalent to accumulating the colors each texel contributes when independently evaluated. Not only does this allow one to MIP map the coefficients directly, but anisotropic filtering techniques that yield improved image quality such as footprint assembly can also be supported. Therefore there are two options for interpolation with parametric texture maps.

First, one can evaluate the polynomial at all sample points and then interpolate the calculated values. Second, parametric texture map parameter coefficients can be interpolated from a MIP-map and used to evaluate the polynomial. This involves filtering the coefficients into a precomputed image pyramid, consisting of polynomial coefficients at a progressively coarser spatial scale. This texture sample drawing rate is used to select which level of the image pyramid to access. As in standard MIP mapping, the level of the pyramid can be a continuous value in which case samples from the image pyramid above and below this value are interpolated and used to reconstruct the parametric texture map polynomial. Whether one option is preferred over the other will depend on the particular implementation.

Figure 5:
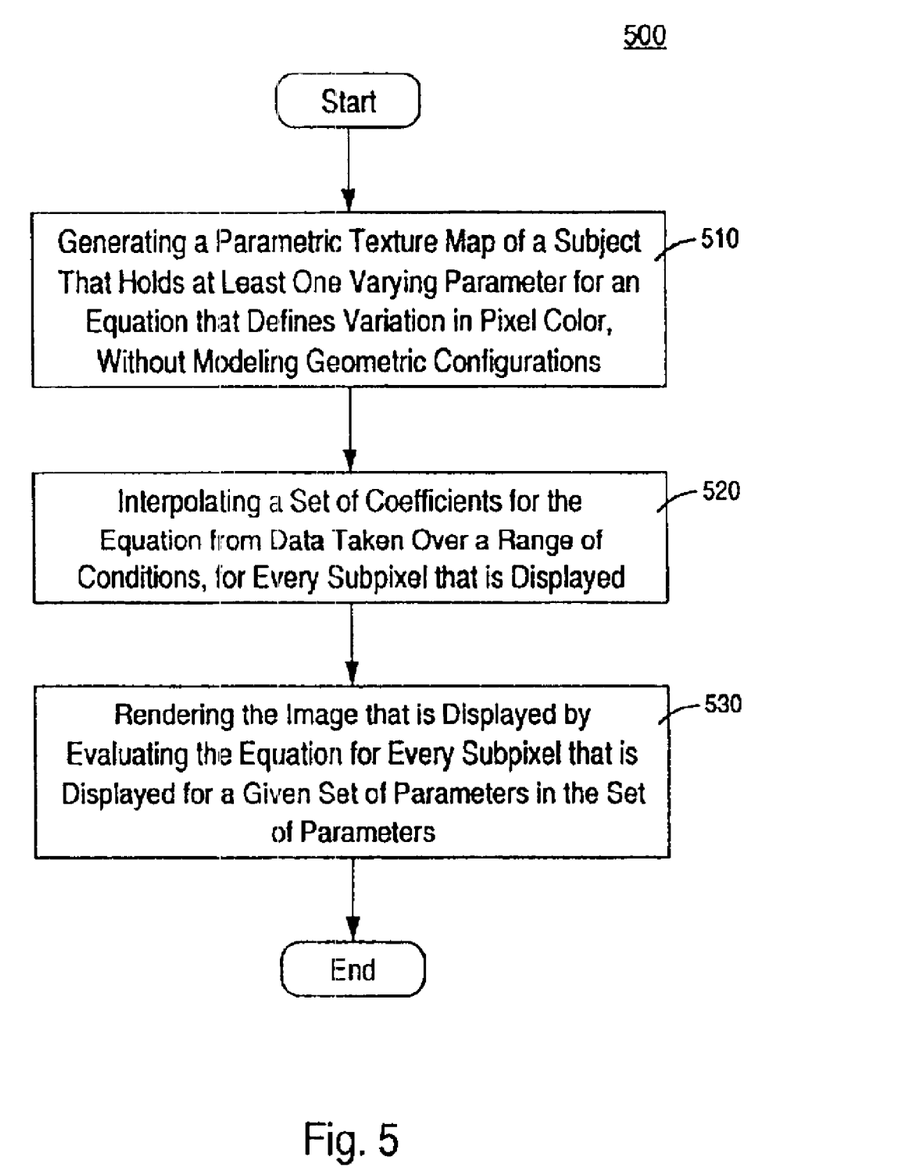
FIG. 5 is a flow diagram illustrating steps in a method for rendering an image using a parametric texture map, in accordance with one embodiment of the present invention.

FIG. 5 is a flow chart 500 further illustrating steps in a method for rendering an image that displays the aforementioned wide range of new effects, using a parametric texture map, in accordance with one embodiment of the present invention. As previously mentioned, a wide range of new effects can also be achieved through the use of a parametric texture map to represent any desired data.

In step 510, the present embodiment generates a parametric texture map of a subject that contains at least one varying parameter for an equation that defines variation in pixel color. The equation contains a set of varying parameters, each of the varying parameters corresponding to a varying condition. As such, the set of varying parameters is associated with a set of varying conditions.

In accordance with embodiments of the present invention, the parametric texture map is generated without any geometric modeling of subject, as is utilized in a bump mapping technique of the prior art.

For purposes of this Application, the widely used term, "subject," is meant to expound on and not to disassociate itself from the previously used term, "object." In addition, for purposes of this Application, the widely used term, "condition," is meant to expound on and not to disassociated itself from the previously used term, "effect."

Furthermore, although the term, "image," is used throughout this disclosure, the term is not limited to conventional film based photographs or to digital based photographs, but is directed towards all means of capturing images in one or more dimensions.

As previously mentioned, the parametric texture map represents any desired data. The sampled data reflects the set of varying conditions over a range of conditions. In particular, each of the varying conditions in the set of varying conditions is sampled over a range within the desired dataset or sampled data. The data reflects the pixel color value for each of the color channels (e.g., red, green, or blue) that is displayed or represented over the range of conditions in the desired dataset. A dataset where only one parameter is varied is referred to as varying in one dimension. A dataset where two parameters are varied is referred to as varying in two dimensions, and so on.

In one embodiment, the image is shown on a display. Those well known in the art understand the display is comprised of a rectilinear grid of thousands of pixels. Each of the pixels produce a color to form an image on the display, in the present invention. Color channels, also known as subpixels, within each pixel are used to control the spectrum of colors available to the pixel and the format to be used in displaying those colors.

Figure 6:
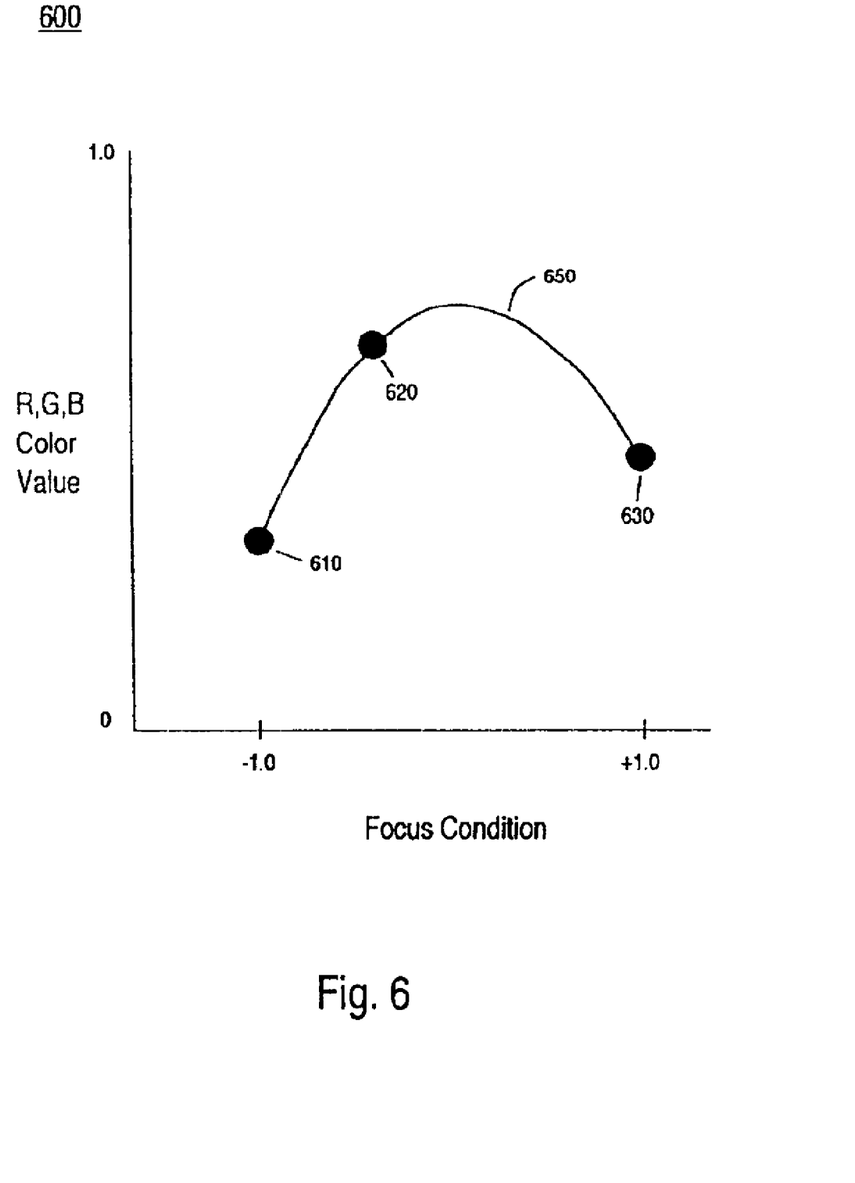
FIG. 6 is a graphical parametric texture mapping representation of color values as a function of a varying condition in one dimension for a subpixel of an image, in accordance with one embodiment of the present invention.

The diagram 600 in FIG. 6 illustrates that the color channels have varying color values, in accordance with one embodiment of the present invention. On the vertical axis, the color value is represented as a value between zero and one, with zero representing the lightest color value, and one representing the deepest color value. The color values are representative of the RGB color values: red, green, and blue color values, respectively, in accordance with one embodiment of the present invention. For example, in the red color channel, a color value of one would give the deepest or fullest red available. A color value of zero would give the lightest red available.

The horizontal axis provides a range of values for the varying parameter, or varying condition. For purposes of illustration, FIG. 6 shows a dataset varying in one dimension, or varying in one condition. Graph 650 represents color values for a corresponding color channel as a function of the condition varying in one dimension.

Graph 650 in the diagram 600 of FIG. 6 shows a dataset of color values for one particular color channel with three data points: point 610, point 620, and point 630. These three points correspond to color values for a particular color channel under three separate conditions within the varying parameter.

Referring back to the flow chart 500 in FIG. 5, the present invention performs an interpolation of the dataset to obtain a set of coefficients for the equation, in step 520. A set of coefficients is determined for every color channel for every pixel that is displayed in creating the image. In each case, the equation is capable of generating or interpolating any color value for the color channel over the range of conditions taken within the dataset.

For example, FIG. 6 provides an interpolation of the dataset of color values for a particular color channel that varies in one dimension. The interpolation of the dataset of color values is presented by graph 650 in FIG. 6. The graph 650 between point 610 and point 630, the minimum and maximum conditions, respectively, provides an interpolation of the dataset of color values that is capable of generating a spectrum of color values over the full range of conditions in the dataset, for that particular color channel. Combining color values for all the color channels of an image, a spectrum of images can be generated within the range of conditions in the dataset.

In one embodiment, instead of storing color values for each subpixel to produce only one image, coefficients of the equation are stored. The equation in one embodiment is a polynomial equation and provides color values for a subpixel as a function of the varying condition or conditions (parameter or parameters, respectively). In another embodiment, the equation is a nonpolynomial equation. The equations for each of the subpixels displayed creates the parametric texture modeling of the image under the varying conditions or parameters.

Returning back to FIG. 6, the present embodiment renders the image by evaluating the equation for every color channel that is displayed, in step 630. The equation can be evaluated for every color channel, since the coefficients for the equation has been determined for every color channel in the previous step 620. The equation is evaluated for a given condition, or a given parameter in one dimension. For equations that vary in more than one dimension, the equation is evaluated for a particular condition in each dimension that varies, as represented by a given set of parameters in the set of varying parameters.

Instead of storing the color values for each color channel for every possible condition, the equation can be evaluated for each color channel under all the varying conditions. As such, when the particular condition, or set of conditions, is specified, a resulting color value for the color channel can be evaluated from the equation. The technique of representing each color channel with a red, green, and blue parametric texture map allows for modeling of the changes in the color of a color channel due to the changes in the conditions or parameters of the equation, in accordance with one embodiment of the present invention.

The variation in the color of a color channel through the range of conditions, as defined by the sampled data, is represented with a second order polynomial, as represented by Eq. 2, in accordance with one embodiment of the present invention, where $D_u$ and $D_v$ represent the two varying parameters or conditions. As such, the conditions, and the represented color values, in Eq. 1 varies in two dimensions, $D_u$ and $D_v$. The quadratic polynomial in Eq. 2 is fit to the dataset of color values associated with a particular color channel.

Per color channel, the coefficients for the equation are stored. In one embodiment, the coefficients are stored in a table, per color channel such as, Table 2 illustrated below. Table 2 illustrates the coefficients for Eq. 2 for a color channel contained within an exemplary pixel. The exemplary pixel has three color channel that in combination form the entire spectrum of colors available to be displayed in the pixel, in one embodiment. The pixel is comprised of three color channels: red, green, and blue.

TABLE 2

| RED | Green | Blue |
| --- | --- | --- |
| A1 | A1 | A1 |
| A2 | A2 | A2 |
| A3 | A3 | A3 |
| A4 | A4 | A4 |
| A5 | A5 | A5 |
| A6 | A6 | A6 |

Table 2 of illustrates entries of coefficients for Eq. 2 for the color channel of the exemplary pixel. In the "RED" column, the various coefficients (A1–A6) of the second order polynomial function that represents the color values of the red subpixel across the defined set of conditions are stored. In the "GREEN" column, the various coefficients (A1–A6) of the second order polynomial function that represents the color values of the green subpixel across the defined set of conditions are stored. In the "BLUE" column, the various coefficients (A1–A6) of the second order polynomial function that represents the color values of the blue subpixel across the defined set of conditions are stored.

In another embodiment, instead of solving for separate red, green, and blue PTM equations for each pixel that is displayed, the luminance over the color channels in each of the pixels is solved. Since the luminance effect is relatively uniform over each of the color channels in a particular pixel, only one set of coefficients need be stored to solve the luminance for that particular pixel given a set of conditions. As such, a parametric texture map is used to reconstruct luminance for each pixel.

In particular, in present embodiment takes advantage of the luminance redundancy by computing an unscaled color per pixel ($R_n(u,v)$, $G_n(u,v)$, $B_n(u,v)$)) that is modulated by a luminance model, $L(u,v)$ that is again dependent on the pixel, as follows:

$$R(u,v)=L(u,v)R_n(u,v);$$
$$G(u,v)=L(u,v)G_n(u,v); \text{ and} \quad (5)$$
$$B(u,v)=L(u,v)B_n(u,v).$$

In one embodiment, the luminance equation can be represented by Eqn. 2 as modified below:

$$L(u,v;l_u,l_v) = a_0(u,v)l_u^2 + a_1(u,v)l_v^2 + a_2(u,v)l_u l_v + \quad (6)$$
$$a_3(u,v)l_u + a_4(u,v)l_u + a_5(u,v)$$

where $l_u$, and $l_v$ represent the two varying parameters or conditions. As such, the coefficients $a_0$ through $a_5$ are stored as well as the unscaled red, green, and blue colors per pixel.

As previously mentioned, the user can choose to leave one of the parameters in the set of varying parameters constant for representing one-dimensional (1D) functions. For example, time variant functions can be represented in this manner, such as a photographic sequence of a scene as time varies during the day. Thus, the desired dataset would contain photographs throughout the day to reflect the variation of time on the subject.

Other conditions or effects, can be represented by the parametric texture map in one or more dimensions, such as, focus conditions (focus depth, depth of focus, etc.); reflectance properties of the object, volume rendering, etc.

While the invention has been illustrated and described by means of specific embodiments, it is to be understood that numerous changes and modifications may be made therein without departing from the spirit and scope of the invention as defined in the appended claims and equivalents thereof.

What is claimed is:

1. A method of rendering an image, comprising
   generating a parametric texture map of a subject that contains at least one varying parameter in a set of varying parameters for an equation that defines variation in pixel color, without modeling geometric configurations of said subject, wherein each varying parameter in said equation corresponds to a varying condition.

2. The method of rendering an image as described in claim 1, further comprising:
   for every subpixel that is displayed for said image, interpolating a set of coefficients for said equation from data taken on said subject from a plurality of sample points taken over a range of conditions associated with said varying condition; and
   for every subpixel that is displayed for said image, storing said set of coefficients that is interpolated in said parametric texture map.

3. The method of rendering an image as described in claim 1, further comprising:
   rendering said image by evaluating said equation for every subpixel that is displayed for said image for a given set of parameters in said set of varying parameters.

4. The method of rendering an image as described in claim 1, further comprising:
   displaying said subject in said image that is of two-dimensions.

5. The method of rendering an image as described in claim 1, wherein said pixel color is taken from an RGB group of colors consisting of:
   red;
   green; and
   blue.

6. The method of rendering an image as described in claim 1, wherein said condition varies in time.

7. The method of rendering an image as described in claim 1, wherein said condition varies in focus.

8. The method of rendering an image as described in claim 1, wherein said condition varies in light direction.

9. The method of rendering an image as described in claim 1, wherein said varying condition is a varying incidence angle that leads to color variation for Fresnel materials.

10. The method of rendering an image as described in claim 1, further comprising:
    generating said parametric texture map of said subject for a polynomial equation.

11. The method of rendering an image as described in claim 1, further comprising:
    generating said parametric texture map for said equation that defines variation in luminance per pixel; and
    scaling fixed RGB values per pixel to define said variation in pixel color.

12. A method of rendering an image, comprising
    generating a parametric texture map of a object that contains at least one varying parameter in a set of varying parameters for an equation that defines variation in pixel luminance, without modeling geometric configurations of said object, wherein each varying parameter in said equation corresponds to a varying effect.

13. The method of rendering an image as described in claim 12, further comprising:
    for every texel that is displayed, interpolating a set of coefficients for said equation from data taken from a plurality of sample points on said object; and
    for every texel that is displayed, storing said set of coefficients in said parametric texture map.

14. The method of rendering an image as described in claim 12, further comprising:
    rendering said image by evaluating said equation for a given set of parameters in said set of varying parameters.

15. The method of rendering an image as described in claim 12, wherein said image of said object is displayed in two-dimensions.

16. The method of rendering an image as described in claim 12, wherein said parametric texture map is generated for luminance of each color per pixel that is displayed for said image.

17. The method of rendering an image as described in claim 16, wherein said pixel color is taken from an RGB group of colors consisting of:
    red;
    green; and
    blue.

18. The method of rendering an image as described in claim 12, wherein said effect varies in time.

19. The method of rendering an image as described in claim 12, wherein said effect varies in focus.

20. The method of rendering an image as described in claim 12, wherein said effect varies in light direction.

21. The method of rendering an image as described in claim 12, wherein said effect is a Fresnel effect.

22. The method rendering an image as described in claim 12, further comprising:
   generating said parametric texture map of said object for a polynomial equation.

23. A computer system comprising:
   a processor;
   a display coupled to said processor;
   a computer readable memory coupled to said processor and containing program instruction that, when executed, implement a method of rendering an image, comprising:
   generating a parametric texture map of a subject that holds at least one varying parameter in a set of varying parameters for an equation that defines variation in pixel color, without modeling geometric configurations of said subject, wherein each varying parameter in said equation corresponds to a varying condition.

24. The computer system as described in claim 23, wherein said method of rendering an image further comprises:
   for every subpixel that is displayed for said image, interpolating a set of coefficients for said equation from data taken on said subject from a plurality of sample points taken over a range of conditions associated with said varying condition; and
   for every subpixel that is displayed for said image, storing said set of coefficients that is interpolated in said parametric texture map.

25. The computer system as described in claim 23, wherein said method of rendering an image further comprises:
   rendering said image by evaluating said equation for every subpixel that is displayed for said image for a given set of parameters in said set of varying parameters.

26. The computer system as described in claim 23, wherein said method of rendering an image further comprises:
   displaying said subject in said image that is of two-dimensions.

27. The computer system as described in claim 23, wherein said pixel color is taken from an RGB group of colors consisting of:
   red;
   green; and
   blue.

28. The computer system as described in claim 23, wherein said condition varies in time.

29. The computer system as described in claim 23, wherein said condition varies in focus.

30. The computer system as described in claim 23, wherein said condition varies in light direction.

31. The computer system as described in claim 23, wherein said varying condition is a varying incidence angle that leads to color variation for Fresnel materials.

32. The computer system as described in claim 23, wherein said method of rendering an image further comprises:
   generating said parametric texture map of said subject for a polynomial equation.

33. The computer system as described in claim 23, wherein said method of rendering an image further comprises:
   generating said parametric texture map for said equation that defines variation in luminance per pixel; and
   scaling fixed RGB values per pixel to define said variation in pixel color.

34. A computer-readable medium having a parametric map stored thereon for rendering an image of a subject, said parametric map comprising:
   a set of coefficients for an equation that defines variation in a pixel color value, without modeling geometric configurations, for each subpixel that is displayed for said image.

35. The computer-readable medium as described in claim 34, wherein said equation further comprises:
   at least one varying parameter in a set of varying parameters, wherein each varying parameter in said equation corresponds to a varying condition.

36. The computer-readable medium as described in claim 35, wherein said set of coefficients form fit said equation to a plurality of sample points taken over a range of conditions associated with said varying condition.

37. The computer-readable medium as described in claim 35, wherein said condition varies in time.

38. The computer-readable medium as described in claim 35, wherein said condition varies in focus.

39. The computer-readable medium as described in claim 35, wherein said condition varies in light direction.

40. The computer-readable medium as described in claim 34, wherein said pixel color value is taken from an RGB group of color values consisting of:
   red;
   green; and
   blue.

41. The computer readable medium as described in claim 34, wherein said equation is a polynomial equation.

42. A computer graphics system comprising:
   a processor;
   a display coupled to said processor;
   a memory coupled to said processor, said memory having stored therein a parametric texture map holding at least one varying parameter in a set of varying parameters for an equation that defines variation in pixel color, without modeling geometric configurations, wherein each varying parameter in said equation corresponds to a varying condition.

43. The computer graphic system as described in claim 42, wherein said parametric map further comprises:
   for every subpixel that is displayed in said image, a set of coefficients that form fit said equation to a plurality of sample points taken over a range of conditions associated with said varying condition.

44. The computer graphics system as described in claim 42, wherein said condition varies in time.

45. The computer graphics system as described in claim 42, wherein said condition varies in focus.

46. The computer graphics system as described in claim 42, wherein said condition varies in light direction.

47. The computer graphics system as described in claim 42, wherein said pixel color is taken from an RGB group of colors consisting of:
   red;
   green; and
   blue.

48. The computer graphics system as described in claim 42, wherein said equation is a polynomial equation.

49. The computer graphics system as described in claim 42, wherein said parametric texture map defines variation in luminance per pixel that is further scaled with fixed RGB values per pixel to define said variation in pixel color.

* * * * *